(12) United States Patent
Cecil et al.

(10) Patent No.: US 9,268,764 B2
(45) Date of Patent: *Feb. 23, 2016

(54) PROBABILITY-BASED APPROACH TO RECOGNITION OF USER-ENTERED DATA

(71) Applicant: Nuance Communications, Inc., Burlington, MA (US)

(72) Inventors: Matthew Cecil, Burlington, MA (US); Santosh Sharan, Acton, MA (US); Jason Lachapelle, Burlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/083,296

(22) Filed: Nov. 18, 2013

(65) Prior Publication Data

US 2014/0074458 A1    Mar. 13, 2014

Related U.S. Application Data

(63) Continuation of application No. 12/186,425, filed on Aug. 5, 2008, now Pat. No. 8,589,149.

(51) Int. Cl.
*G06F 17/27* (2006.01)
*G06F 17/25* (2006.01)
*G06F 3/023* (2006.01)

(52) U.S. Cl.
CPC ............. *G06F 17/25* (2013.01); *G06F 3/0237* (2013.01); *G06F 17/273* (2013.01); *G06F 17/276* (2013.01)

(58) Field of Classification Search
CPC ... G06F 3/0237; G06F 17/273; G06F 3/0219; G06F 3/0489; H04M 1/271; H04M 1/677; H04M 1/72552; H04M 1/7258; H04M 1/72588; H04M 2250/22

USPC .................. 704/9, 10, 236, 500, 270; 725/40; 715/810, 257; 455/550.1, 413, 404.1; 382/187; 379/88.01; 345/172, 169; 341/22; 200/600

See application file for complete search history.

(56) References Cited

U.S. PATENT DOCUMENTS

| | | | |
|---|---|---|---|
| 4,730,252 A | 3/1988 | Bradshaw | |
| 5,422,656 A | 6/1995 | Allard et al. | |
| 5,475,735 A | 12/1995 | Williams et al. | |
| 5,638,369 A | 6/1997 | Ayerst et al. | |

(Continued)

FOREIGN PATENT DOCUMENTS

| | | |
|---|---|---|
| CA | 2454334 A1 | 2/2003 |
| CN | 1283341 A | 2/2001 |

(Continued)

OTHER PUBLICATIONS

International Search Report and Written Opinion for International Application No. PCT/US2012/023884, mailing date Sep. 3, 2012, 8 pages.
International Search Report for International Application No. PCT/US2014/011538, mailing date Apr. 16, 2014, 3 pages.
3rd Generation Partnership Project. "Specification of the SIM Application Toolkit for the Subscriber Identity Module—MobileEquipment (SIM-ME) Interface (Release 1999)," 3GPPOrganizational Partners, 2004, 143 pages.

(Continued)

*Primary Examiner* — Michael Colucci
(74) *Attorney, Agent, or Firm* — Perkins Coie LLP

(57) ABSTRACT

A method for entering keys in a small key pad is provided. The method comprising the steps of: providing at least a part of keyboard having a plurality of keys; and predetermining a first probability of a user striking a key among the plurality of keys. The method further uses a dictionary of selected words associated with the key pad and/or a user.

20 Claims, 3 Drawing Sheets

(56) References Cited

U.S. PATENT DOCUMENTS

| | | | |
|---|---|---|---|
| 5,675,628 A | 10/1997 | Hokkanen | |
| 5,790,798 A | 8/1998 | Beckett, II et al. | |
| 5,831,598 A | 11/1998 | Kauffert et al. | |
| 5,845,211 A | 12/1998 | Roach, Jr. | |
| 5,963,666 A * | 10/1999 | Fujisaki | G06K 9/723 |
| | | | 382/187 |
| 6,031,467 A | 2/2000 | Hymel et al. | |
| 6,151,507 A | 11/2000 | Laiho et al. | |
| 6,199,045 B1 | 3/2001 | Giniger et al. | |
| 6,219,047 B1 | 4/2001 | Bell | |
| 6,245,756 B1 | 6/2001 | Patchev et al. | |
| 6,246,756 B1 | 6/2001 | Borland et al. | |
| 6,301,480 B1 | 10/2001 | Kennedy, III et al. | |
| 6,368,205 B1 | 4/2002 | Frank | |
| 6,370,399 B1 | 4/2002 | Phillips | |
| 6,389,278 B1 | 5/2002 | Singh | |
| 6,424,945 B1 | 7/2002 | Sorsa | |
| 6,430,252 B2 | 8/2002 | Reinwand et al. | |
| 6,430,407 B1 | 8/2002 | Turtiainen | |
| 6,466,783 B2 | 10/2002 | Dahm et al. | |
| 6,496,979 B1 | 12/2002 | Chen et al. | |
| 6,615,038 B1 | 9/2003 | Moles et al. | |
| 6,618,478 B1 | 9/2003 | Stuckman et al. | |
| 6,646,570 B1 | 11/2003 | Yamada et al. | |
| 6,654,594 B1 | 11/2003 | Hughes et al. | |
| 6,668,169 B2 | 12/2003 | Burgan et al. | |
| 6,720,864 B1 | 4/2004 | Wong et al. | |
| 6,748,211 B1 | 6/2004 | Isaac et al. | |
| 6,766,017 B1 | 7/2004 | Yang | |
| 6,792,280 B1 | 9/2004 | Hori et al. | |
| 6,795,703 B2 | 9/2004 | Takae et al. | |
| 6,819,932 B2 | 11/2004 | Allison et al. | |
| 6,909,910 B2 | 6/2005 | Pappalardo et al. | |
| 6,922,721 B1 | 7/2005 | Minborg et al. | |
| 6,931,258 B1 | 8/2005 | Jarnstrom et al. | |
| 6,940,844 B2 | 9/2005 | Purkayastha et al. | |
| 6,944,447 B2 | 9/2005 | Portman et al. | |
| 6,954,754 B2 | 10/2005 | Peng | |
| 6,970,698 B2 | 11/2005 | Majmundar et al. | |
| 6,978,147 B2 | 12/2005 | Coombes | |
| 7,024,199 B1 | 4/2006 | Massie et al. | |
| 7,030,863 B2 | 4/2006 | Longe et al. | |
| 7,031,697 B2 | 4/2006 | Yang et al. | |
| 7,080,321 B2 | 7/2006 | Aleksander et al. | |
| 7,092,738 B2 | 8/2006 | Creamer et al. | |
| 7,098,896 B2 | 8/2006 | Kushler et al. | |
| 7,099,288 B1 | 8/2006 | Parker et al. | |
| 7,117,144 B2 | 10/2006 | Goodman et al. | |
| 7,129,932 B1 | 10/2006 | Klarlund et al. | |
| 7,170,993 B2 | 1/2007 | Anderson et al. | |
| 7,177,665 B2 | 2/2007 | Ishigaki | |
| 7,190,960 B2 | 3/2007 | Wilson et al. | |
| 7,194,257 B2 | 3/2007 | House et al. | |
| 7,209,964 B2 | 4/2007 | Dugan et al. | |
| 7,218,249 B2 | 5/2007 | Chadha | |
| 7,236,166 B2 | 6/2007 | Zinniel et al. | |
| 7,259,751 B2 | 8/2007 | Hughes et al. | |
| 7,277,088 B2 | 10/2007 | Robinson et al. | |
| 7,287,026 B2 | 10/2007 | Oommen | |
| 7,295,836 B2 | 11/2007 | Yach et al. | |
| 7,308,497 B2 | 12/2007 | Louviere et al. | |
| 7,319,957 B2 | 1/2008 | Robinson et al. | |
| 7,353,016 B2 | 4/2008 | Roundtree et al. | |
| 7,359,706 B2 | 4/2008 | Zhao | |
| 7,376,414 B2 | 5/2008 | Engstrom | |
| 7,379,969 B2 | 5/2008 | Osborn, Jr. | |
| 7,453,439 B1 | 11/2008 | Kushler et al. | |
| 7,493,381 B2 | 2/2009 | Garg | |
| 7,539,484 B2 | 5/2009 | Roundtree | |
| 7,542,029 B2 | 6/2009 | Kushler | |
| 7,558,965 B2 | 7/2009 | Wheeler et al. | |
| 7,602,377 B2 * | 10/2009 | Kim | H04M 1/67 |
| | | | 345/169 |
| 7,647,075 B2 | 1/2010 | Tsuda et al. | |
| 7,647,527 B2 | 1/2010 | Duan et al. | |
| 7,660,870 B2 | 2/2010 | Vandermeijden et al. | |
| 7,676,221 B2 | 3/2010 | Roundtree et al. | |
| 7,689,588 B2 | 3/2010 | Badr et al. | |
| 7,725,072 B2 | 5/2010 | Bettis et al. | |
| 7,735,021 B2 | 6/2010 | Padawer et al. | |
| 7,756,545 B2 | 7/2010 | Roundtree | |
| 7,773,982 B2 | 8/2010 | Bishop et al. | |
| 7,777,728 B2 | 8/2010 | Rainisto | |
| 7,783,729 B1 | 8/2010 | Macaluso | |
| 7,809,376 B2 | 10/2010 | Letourneau et al. | |
| 7,809,574 B2 * | 10/2010 | Roth | G10L 15/19 |
| | | | 704/270 |
| 7,810,030 B2 | 10/2010 | Wu et al. | |
| 7,881,703 B2 | 2/2011 | Roundtree et al. | |
| 7,899,915 B2 | 3/2011 | Reisman | |
| 7,912,700 B2 | 3/2011 | Bower et al. | |
| 7,920,132 B2 | 4/2011 | Longe et al. | |
| 7,957,955 B2 | 6/2011 | Christie et al. | |
| 8,036,645 B2 | 10/2011 | Roundtree et al. | |
| 8,201,087 B2 | 6/2012 | Kay et al. | |
| 8,285,263 B2 | 10/2012 | Roundtree et al. | |
| 8,301,123 B2 | 10/2012 | Roundtree et al. | |
| 8,589,149 B2 | 11/2013 | Cecil et al. | |
| 8,666,728 B2 | 3/2014 | Rigazio et al. | |
| 8,934,611 B2 * | 1/2015 | Doulton | G10L 15/265 |
| | | | 379/88.01 |
| 9,043,725 B2 * | 5/2015 | Wakefield | G06F 3/0202 |
| | | | 341/33 |
| 2001/0046886 A1 | 11/2001 | Ishigaki | |
| 2002/0065109 A1 | 5/2002 | Mansikkaniemi et al. | |
| 2002/0112172 A1 | 8/2002 | Simmons | |
| 2002/0115476 A1 | 8/2002 | Padawer et al. | |
| 2002/0123368 A1 | 9/2002 | Yamadera et al. | |
| 2002/0155476 A1 | 10/2002 | Pourmand et al. | |
| 2003/0011574 A1 * | 1/2003 | Goodman | G06F 3/0237 |
| | | | 345/172 |
| 2003/0013483 A1 | 1/2003 | Ausems et al. | |
| 2003/0039948 A1 | 2/2003 | Donahue | |
| 2003/0112931 A1 | 6/2003 | Brown et al. | |
| 2003/0187650 A1 | 10/2003 | Moore et al. | |
| 2003/0204725 A1 | 10/2003 | Itoi et al. | |
| 2003/0233461 A1 | 12/2003 | Mariblanca-Nieves et al. | |
| 2004/0136564 A1 | 7/2004 | Roeber et al. | |
| 2004/0142720 A1 | 7/2004 | Smethers | |
| 2004/0171375 A1 | 9/2004 | Chow-Toun | |
| 2004/0172561 A1 | 9/2004 | Iga | |
| 2004/0183833 A1 | 9/2004 | Chua | |
| 2004/0193444 A1 | 9/2004 | Hufford et al. | |
| 2004/0198316 A1 | 10/2004 | Johnson | |
| 2004/0242209 A1 | 12/2004 | Kruis et al. | |
| 2005/0003850 A1 | 1/2005 | Tsuda et al. | |
| 2005/0108329 A1 | 5/2005 | Weaver et al. | |
| 2005/0114115 A1 | 5/2005 | Karidis et al. | |
| 2005/0116840 A1 * | 6/2005 | Simelius | H04M 1/67 |
| | | | 341/22 |
| 2005/0120345 A1 | 6/2005 | Carson | |
| 2005/0266798 A1 | 12/2005 | Moloney et al. | |
| 2005/0289463 A1 | 12/2005 | Wu et al. | |
| 2006/0003758 A1 | 1/2006 | Bishop et al. | |
| 2006/0047830 A1 | 3/2006 | Nair et al. | |
| 2006/0158436 A1 | 7/2006 | LaPointe et al. | |
| 2006/0168303 A1 | 7/2006 | Oyama et al. | |
| 2006/0176283 A1 * | 8/2006 | Suraqui | G06F 3/0237 |
| | | | 345/169 |
| 2006/0229054 A1 | 10/2006 | Erola et al. | |
| 2006/0245391 A1 | 11/2006 | Vaidya et al. | |
| 2006/0274869 A1 | 12/2006 | Morse | |
| 2007/0019563 A1 | 1/2007 | Ramachandran et al. | |
| 2007/0061243 A1 | 3/2007 | Ramer et al. | |
| 2007/0064743 A1 | 3/2007 | Bettis et al. | |
| 2007/0188472 A1 * | 8/2007 | Ghassabian | B41J 3/445 |
| | | | 345/169 |
| 2007/0211923 A1 | 9/2007 | Kuhlman | |
| 2007/0293199 A1 | 12/2007 | Roundtree et al. | |
| 2007/0293200 A1 | 12/2007 | Roundtree et al. | |
| 2008/0039056 A1 | 2/2008 | Mathews et al. | |
| 2008/0119217 A1 * | 5/2008 | Coxhill | H04M 1/67 |
| | | | 455/550.1 |
| 2008/0133222 A1 | 6/2008 | Kogan et al. | |

(56) References Cited

U.S. PATENT DOCUMENTS

| | | | |
|---|---|---|---|
| 2008/0138135 A1 | 6/2008 | Gutowitz | |
| 2008/0189550 A1 | 8/2008 | Roundtree | |
| 2008/0189605 A1* | 8/2008 | Kay | G06F 3/0237 715/257 |
| 2008/0194296 A1 | 8/2008 | Roundtree | |
| 2008/0256447 A1 | 10/2008 | Roundtree et al. | |
| 2008/0280588 A1 | 11/2008 | Roundtree et al. | |
| 2009/0008234 A1* | 1/2009 | Tolbert | H01H 13/702 200/600 |
| 2009/0089666 A1 | 4/2009 | White et al. | |
| 2009/0109067 A1* | 4/2009 | Burstrom | G06F 17/276 341/22 |
| 2009/0124271 A1 | 5/2009 | Roundtree et al. | |
| 2009/0249198 A1 | 10/2009 | Davis et al. | |
| 2009/0254912 A1 | 10/2009 | Roundtree et al. | |
| 2009/0262078 A1* | 10/2009 | Pizzi | G06F 1/1626 345/169 |
| 2009/0328101 A1* | 12/2009 | Suomela | H04N 5/44543 725/40 |
| 2010/0035583 A1* | 2/2010 | O'Connell | H04M 3/533 455/413 |
| 2010/0056114 A1 | 3/2010 | Roundtree et al. | |
| 2010/0087175 A1 | 4/2010 | Roundtree | |
| 2010/0093396 A1 | 4/2010 | Roundtree | |
| 2010/0112997 A1 | 5/2010 | Roundtree | |
| 2010/0134328 A1* | 6/2010 | Gutowitz | G06F 3/0233 341/22 |
| 2010/0144325 A1 | 6/2010 | Roundtree et al. | |
| 2010/0159902 A1 | 6/2010 | Roundtree et al. | |
| 2010/0169443 A1 | 7/2010 | Roundtree et al. | |
| 2010/0225591 A1 | 9/2010 | Macfarlane | |
| 2010/0279669 A1 | 11/2010 | Roundtree | |
| 2010/0304704 A1* | 12/2010 | Najafi | H01Q 1/242 455/404.1 |
| 2010/0321299 A1 | 12/2010 | Shelley et al. | |
| 2011/0018812 A1 | 1/2011 | Baird | |
| 2011/0117894 A1 | 5/2011 | Roundtree et al. | |
| 2011/0119623 A1 | 5/2011 | Kim et al. | |
| 2011/0193797 A1 | 8/2011 | Unruh | |
| 2011/0248924 A1 | 10/2011 | Bhattacharjee | |
| 2011/0264442 A1 | 10/2011 | Huang | |
| 2012/0028620 A1 | 2/2012 | Roundtree et al. | |
| 2012/0047454 A1 | 2/2012 | Harte | |
| 2012/0203544 A1 | 8/2012 | Kushler | |
| 2012/0254744 A1 | 10/2012 | Kay | |
| 2013/0005312 A1 | 1/2013 | Roundtree et al. | |
| 2013/0120278 A1 | 5/2013 | Cantrell | |
| 2014/0198047 A1 | 7/2014 | Unruh et al. | |
| 2014/0198048 A1 | 7/2014 | Unruh et al. | |

FOREIGN PATENT DOCUMENTS

| | | |
|---|---|---|
| CN | 2478292 | 2/2002 |
| CN | 1361995 A | 7/2002 |
| CN | 1611087 A | 4/2005 |
| EP | 1387241 A2 | 2/2004 |
| EP | 1538855 A2 | 6/2005 |
| GB | 2340344 A | 2/2000 |
| GB | 2365711 A | 2/2002 |
| JP | 62072058 A | 4/1987 |
| JP | 07203536 A | 8/1995 |
| JP | 08166945 | 6/1996 |
| JP | 09-507986 T | 8/1997 |
| JP | 10084404 A | 3/1998 |
| JP | 11-195062 A | 7/1999 |
| JP | 11259199 A | 9/1999 |
| JP | 2000348022 A | 12/2000 |
| JP | 2001069204 A | 3/2001 |
| JP | 2002-135848 A | 5/2002 |
| JP | 200305880 | 1/2003 |
| JP | 2003067334 A | 3/2003 |
| JP | 2003108182 A | 4/2003 |
| JP | 2003-188982 A | 7/2003 |
| JP | 2003186590 A | 7/2003 |
| JP | 2003-280803 A | 10/2003 |
| JP | 2003-303172 A | 10/2003 |
| JP | 2003-308148 A | 10/2003 |
| JP | 2003-309880 A | 10/2003 |
| JP | 2004021580 A | 1/2004 |
| JP | 2004032056 A | 1/2004 |
| JP | 2004-048790 A | 2/2004 |
| JP | 2004364122 A | 12/2004 |
| JP | 2005110063 A | 4/2005 |
| JP | 2005167463 A | 6/2005 |
| KR | 200344337 | 6/2003 |
| WO | WO-9707641 | 2/1997 |
| WO | WO-0070888 A2 | 11/2000 |
| WO | WO-0186472 A1 | 11/2001 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A2 | 4/2008 |
| WO | WO-2008086320 A1 | 7/2008 |
| WO | WO-2008128119 A1 | 10/2008 |

OTHER PUBLICATIONS

Center for Customer Driven Quality at Purdue University, "It's the Solution, Stupid," 2004, 2 pages.

European Search Report for European Application No. 05713762.2, dated Jun. 27, 2008, Applicant SNAPin Software Inc., 6 pages.

Exam Report for Canadian Application No. 2,556,773, Mail Date Dec. 5, 2011, 2 pages.

Extended European Search Report for European Application No. 12005720.3, Dated Dec. 20, 2012, 6 pages.

Extended European Search Report for European Application No. 12005720.3, Dated Dec. 12, 2012, 5 pages.

Gartner, "Contact Center Investment Strategy and Leading Edge technologies," http://www.gartner.com/4_decision_tools/measurement/measure_it_articles/2002_12/contact_center_investment_strategy_jsp, accessed on Jul. 8, 2008, 4 pages.

International Search Report for International Application No. PCT/US06/40398, dated Jul. 15, 2008, Applicant SNAPin Software Inc.

International Search Report for International Application No. PCT/US08/60137, dated Jun. 30, 2008, Applicant SNAPinSoftware Inc.

International Search Report of International Application No. PCT/US05/05135, dated Oct. 26, 2005, 3 pages.

International Search Report of International Application No. PCT/US05/33973, dated Apr. 19, 2006.

International Search Report of International Application No. PCT/US05/5517, dated Jul. 6, 2005.

International Search Report of International Application No. PCT/US06/24637, dated Aug. 1, 2007.

International Search Report of International Application No. PCT/US07/61806, dated Feb. 13, 2008.

International Search Report of International Application No. PCT/US08/50447, dated Apr. 10, 2008.

Japanese Office Action dated Jan. 23, 2012 for Japanese Patent Application No. 2008-230347, 69 pages.

Japanese Office Action dated Jun. 16, 2008 under Japanese Patent Application No. 2006-554217, 10 pages.

Japanese Office Action dated Oct. 27, 2011 under Japanese Patent Application No. 2008-545964, 39 pages.

Second Office Action for Chinese Patent Application No. 200580011621.9, Mail Date Dec. 11, 2009, 22 pages.

SNAPin Software Inc., "SNAPin White Paper: The Service Experience Opportunity," <http://www.snapin.com>, 2005, 16 pages.

Supplementary European Search Report for European Patent Application No. 05723446, Mail Date Jan. 8, 2008, 6 pages.

Supplementary European Search Report for European Patent Application No. 06840247.8, Mail Date Feb. 2, 2012, 8 pages.

* cited by examiner

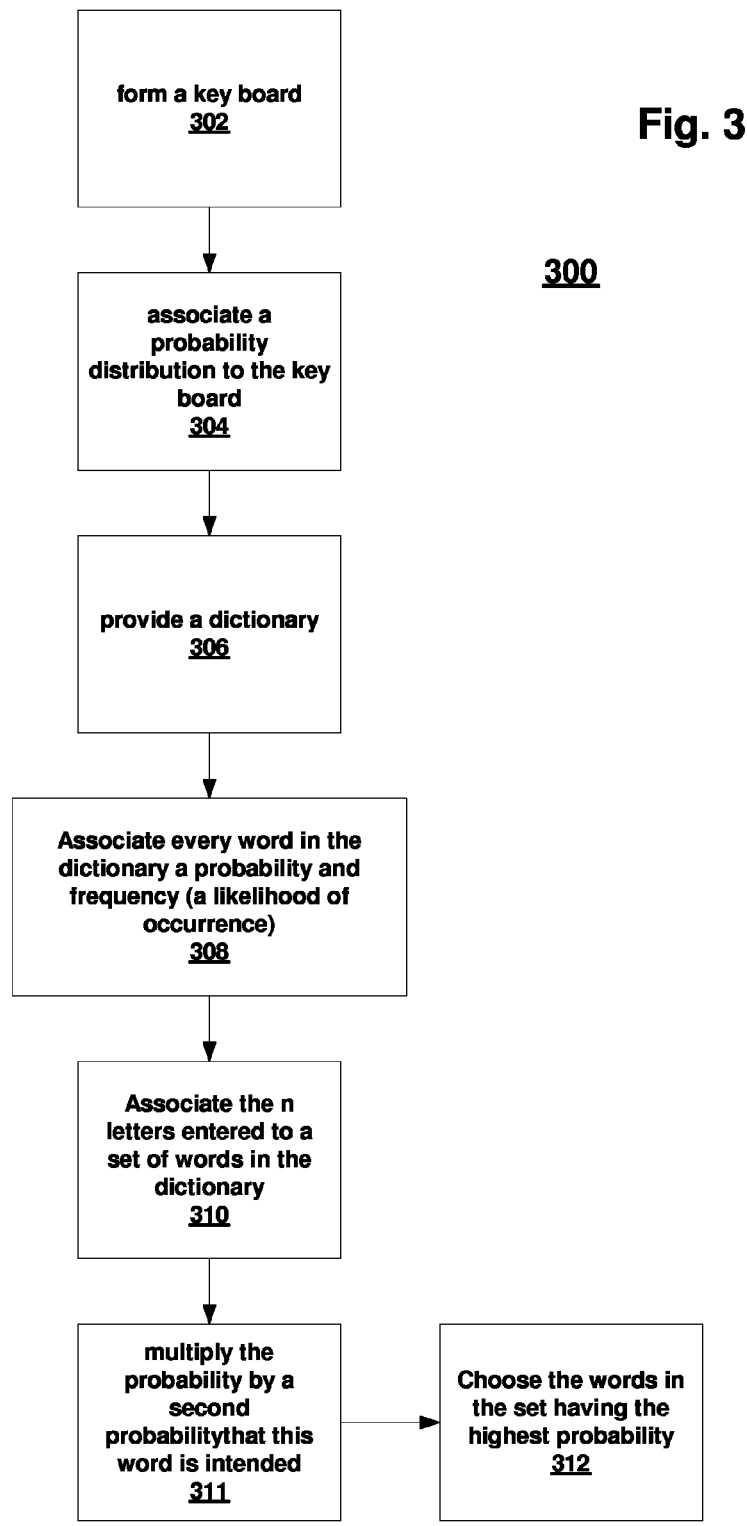

PROBABILITY-BASED APPROACH TO RECOGNITION OF USER-ENTERED DATA

This application claims the benefit of U.S. patent application Ser. No. 12/186,425 filed Aug. 5, 2008, now U.S. Pat. No. 8,589,149, entitled "A PROBABILITY-BASED APPROACH TO RECOGNITION OF USER-ENTERED DATA" which is incorporated herein by reference in its entirety.

TECHNICAL FIELD

This invention relates to an apparatus and methods for data entry, more specifically this invention relates to an apparatus and methods for a probability-based approach to data entry.

BACKGROUND

Data entry using a key board or a key pad is known. However, a user may mistakenly enter an unintended key within a neighborhood of the intended key. Therefore, it is desirable to provide a probability based scheme to determine the intended input of the user based upon the sequence of entered keys.

SUMMARY

There is provided a method comprising the steps of: providing at least a part of keyboard having a plurality of keys; and associating a probability distribution to each key on the key board.

There is provided a method for entering data by pressing keys on a key pad, be it a key pad with physical keys or an arrangement of domains on a touch screen, comprising the steps of: providing at least a part of keyboard having a plurality of keys; and predetermining probabilities of the user striking a key among the plurality of keys, given the intended key.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is a flowchart of the present invention.

Figures 1, 1A:
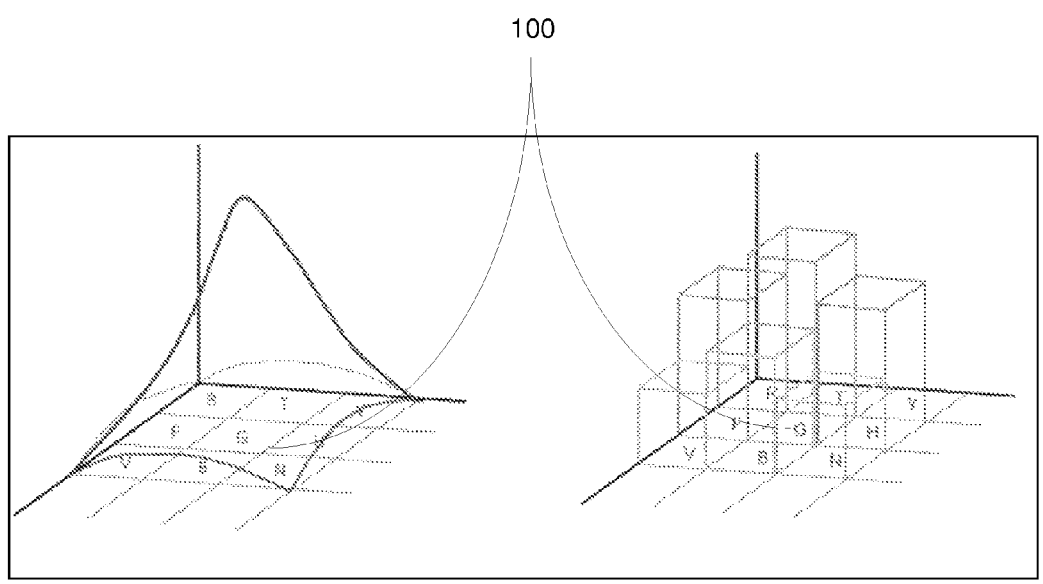
FIG. 1 illustrates an example of a continuous probability density based key entry scheme on a portion of a first key board.
FIG. 1A illustrates a discrete probability density based upon FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the figures represent just one possible example of the method outlined in the sequel.

DETAILED DESCRIPTION

Before describing in detail embodiments that are in accordance with the present invention, it should be observed that the embodiments reside primarily in combinations of method steps and apparatus components related to discerning and/or using probability based method or apparatus to process user-entered data. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The purpose of the present invention is to describe a method and apparatus for discerning user input on portable keyboards in devices such as mobile computers and smartphones, where it is assumed that the means of input (keyboard or touch screen) is such that mistakes sometimes occur (e.g. individual keys on the keyboard are smaller than the human finger, etc.). Listed infra are a few examples. However, the present invention is contemplated for a variety of data entry scenarios including any sized or shaped key pads or key boards, as well as any suitable data entry means.

The present patent application describes two examples for expository purposes: first, typing text on a QWERTY keyboard; and second, entering UPC codes of items on a numerical keypad. We will refer to these examples as "example 1" and "example 2" respectively. It should be understood that the present invention applies to many scenarios beyond these two. The general setup is described below.

Definition of terms:

1. The term "keyboard" comprises any means of user input. The keyboard comprises of keys, which is as previously indicated. The keyboard comprises physical keys or may simply comprise domains on a touch screen. Lowercase Greek letters are used to denote a generic key (for example $\alpha$; $\beta$; etc.), while capital letter such as K will be used to denote the set of all keys.

2. The term "word" will be used to indicate an item of intended user input. If the user is writing for text input, this would be a word in the appropriate language. If, for example, the user is checking inventory by inputting UPC codes subject items in a warehouse environment, a word would be the UPC code of an item in inventory. It is assumed that the user intends on entering a word using the keyboard, and mistakes sometimes occur.

3. The term "dictionary" will be used to indicate a predetermined set of words. In the case of text input, this will be an actual dictionary or lexicon, where in the case of numerical code input this would be a list of all items, for example, in inventory and their UPC codes.

4. The term "string" will be used in reference to the actual user input. This may or may not be a word, since part of the assumption is that the user is prone to making mistakes. However, it is assumed that each string is meant to be a word from the dictionary.

The proposed general setup is as follows. A keyboard is provided, as is a dictionary of words. It will be assumed that the user intends on entering a word from the subject dictionary using the keyboard. Dependent on the arrangement and form of the provided keyboard, there will be a number associated to each pair of keys $(\alpha, \beta)$ indicating the probability that key $\beta$ will be pressed when key a is intended. Thus given a user entered string, one is able to associate to every dictionary word a number indicating the likelihood that the entered string would occur given the dictionary word was intended (see further description infra). This works by viewing each keystroke as an independent event, with probabilities given as described above. Combined with optional additional probabilities indicating the likelihood each word was intended, one gets a probability associated to each dictionary word indicating the likelihood it was intended by the user. These scores or results are then used to rank dictionary words according to the most likely outcome (see further description infra).

Referring to FIG. 1, a part of a QWERY keyboard 100 is shown, in reference to example 1. Assuming a typical user (not shown) intends upon pressing or hitting the "G" key, the user would most likely have a direct hit upon the "G" key. However, the user may hit other keys in close proximity to the "G" key albeit with a lower probability. This scenario occurs most often when the keyboard is too small to accommodate the user's entering means such as fingers. Alternatively, the user may just be careless or has a physical limitation preventing an accurate key entry. As can be seen, FIG. 1 is meant to give a representation of how a user might miss the "G" key; it is a representation of a continuous probability density centered on the "G" key.

Referring to FIG. 1A, a discrete probability density based upon FIG. 1 is shown. Since pressing a key yields the same input regardless of precisely where the key was struck, such a discrete probability density is more useful. As can be seen, intending upon hitting "G" key and actually hitting the "G" key typically has the highest probability. Other keys proximate to the "G" key have relatively low probabilities.

It should be noted that such probability densities are assumed to be arbitrary. We have chosen to represent the specific example of typing on a QWERTY keyboard, where we have chosen the probability densities to be roughly Gaussian. Practically, these probability densities can be preset or determined by experimental testing. The densities are directly related to the "probability matrix" described below.

FIGS. 1-1A generally assume that a user is entering text on a keyboard (physical or touch screen, QWERY or otherwise). The assumption is that the user is entering a word in a predetermined dictionary. The algorithm or a method suitable for computer implementation will attempt to discern the word which the user intends on entering, whereby allowing for the user to make typing errors and correcting the errors based upon probability (see infra). The primary assumption is that the user does not make 'large' mistakes, but may make many 'small' mistakes. This will be explained precisely infra.

Figure 2:
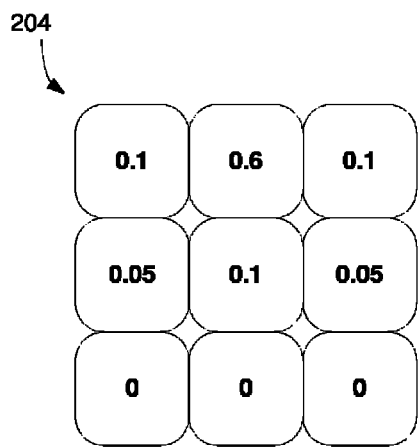
FIG. 2 illustrates a second key board layout of the present invention.

Referring to FIG. 2, a second key board layout 200 of the present invention is shown in relation to example 2. Key board layout 200 has nine keys ranging from one-to-nine (1-9). Key board layout 200 forms a part of a typical numerical key pad.

Figure 2A:
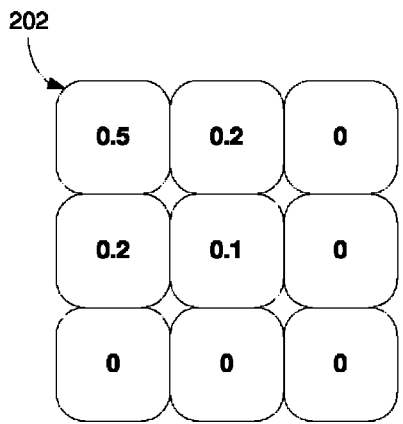
FIG. 2A illustrates a probability distribution associated to key 1 of FIG. 2.
Figure 2B:
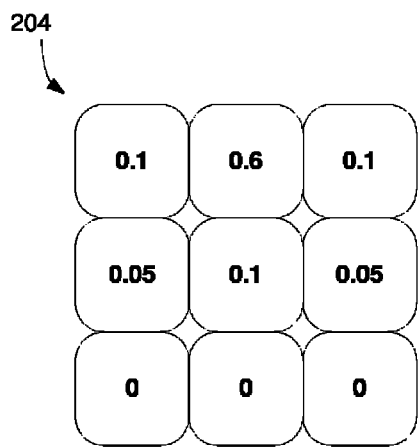
FIG. 2B illustrates a probability distribution associated to key 2 of FIG. 2.
Figure 2C:
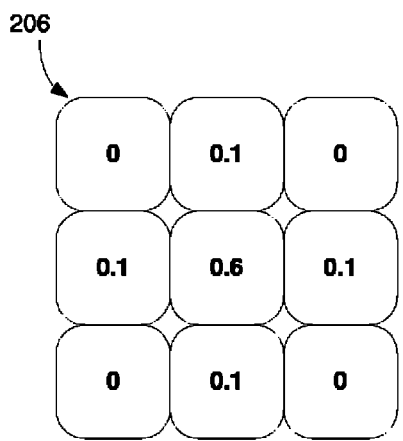
FIG. 2C illustrates a probability distribution associated to key 5 of FIG. 2.

Referring to FIGS. 2A-2C, a sequence of three scenarios of probability densities of keys on the key board layout 200 of FIG. 2 is shown. Note that the number associated to each key in FIGS. 2A-2C is analogous to the height of the density in FIG. 1A.

In FIG. 2A, a first scenario 202 in which a user intends to strike or press number "1" key is shown. According to this specific probability distribution, the probability of the user hitting number "1" key is 0.5. Similarly, the probability of the user hitting number "2" key and number "4" key are 0.2 respectively. The probability of the user hitting number "5" key is 0.1. Note that it is highly, unlikely that the user will hit keys "3", "6", "7", "8", and "9". Therefore, the probability of hitting keys "3", "6", "7", "8", and "9" is zero.

In FIG. 2B, a second scenario 204 in which a user intends to strike or press number "2" key is shown. According to this specific probability distribution, the probability of the user hitting number "2" key is 0.6. Similarly, the probability of the user hitting number "1" key and number "3" key and number "5" key are 0.1 respectively. The probability of the user hitting number "4" key and number "6" key is 0.05. Note that it is highly, unlikely that the user will hit keys "7", "8", and "9". Therefore, the probability of hitting keys "7", "8", and "9" is zero.

In FIG. 2C, a third scenario 206 in which a user intends to strike or press number "5" key is shown. According to this specific probability distribution, the probability of the user hitting number "5" key is 0.6. Similarly, the probability of the user hitting number "2" key, number "4" number "6" key, number "8" keys are 0.1 respectively. Note that it is highly, unlikely that the user will hit keys "1", "3", "7", and "9". Therefore, the probability of hitting keys "1", "3", "7", and "9" is zero.

As can be seen, FIGS. 2-2C follows example 2 in which the user is entering numerical codes. The numerical codes include codes which correspond to inventory or products (UPC code, for example). Here the 'keyboard' might be a small numerical keypad, physical or touch screen. This scenario is used to produce examples infra.

Probability Matrix

The qualities of the keyboard (hardware attributes, shape, number of keys, etc) determine how likely the user is to strike keys other than his intended key. Further, entrenched user typing behaviors sometimes affect the likelihood or the probabilities as well. For each pair of keys $(\alpha; \beta)$ we give a probability (a number ranging from 0 to 1 indicating a probability or likelihood) that the user strikes $\beta$ when he intends on striking $\alpha$. We will call this probability $P(\alpha; \beta)$. Notice since it is assumed that the user will press some key, we have the relationship $$\Sigma_{\beta \in K} P(\alpha, \beta) = 1 \text{ for all } \alpha \in K \qquad (1)$$

To account for the scenario when the user misses the keyboard entirely, we can consider the complement of the keyboard as another key in itself. This is particularly applicable to the touch screen scenario.

Once an order is assigned to the keys, this set of probabilities can be written as an n×n matrix, where n denotes the number of keys on our keyboard. We let $P = \{p_{ij}\}$, where $p_{ij}$ is the probability that the user presses the $j^{th}$ key when he intends on pressing the $i^{th}$ key. P will be referred to as the "probability matrix". In terms of this matrix, Eq. 1 indicates that the entries in any row sum to 1.

Suppose our keyboard consists of 9 numerical keys arranged in the format as shown in FIG. 2. Associated to this keyboard, we have a 9×9 matrix, where the ordering of the keys is given by their numerical order.

$$P = \begin{pmatrix} .5 & .2 & 0 & .2 & .1 & 0 & 0 & 0 & 0 \\ .1 & .6 & .1 & .05 & .1 & .05 & 0 & 0 & 0 \\ 0 & .2 & .5 & 0 & .1 & .2 & 0 & 0 & 0 \\ .1 & .05 & 0 & .6 & .1 & 0 & .1 & .05 & 0 \\ 0 & .1 & 0 & .1 & .6 & .1 & 0 & .1 & 0 \\ 0 & .05 & .1 & 0 & .1 & .6 & 0 & .05 & .1 \\ 0 & 0 & 0 & .2 & .1 & 0 & .5 & .2 & 0 \\ 0 & 0 & 0 & .05 & .1 & .05 & .1 & .6 & .1 \\ 0 & 0 & 0 & 0 & .1 & .2 & 0 & .2 & .5 \end{pmatrix} \quad \text{Eq (2)}$$

So, this matrix indicates that the user will press the "6" key 10% of the time he intends on pressing the "5" key (since p56=0.1). Notice the matrix also indicates that the user "will never" miss an intended key by a large amount or on keys not in close proximity to the intended key. For example, since p46=0, it is assumed that the user will never press "6" when "4" is intended. One should compare row 1 of P to FIG. 2A, row 2 to FIG. 2B, and row 5 to FIG. 2C.

The probability matrix (Eq. 2) acts as the model for user input. The more accurate this model, the more efficiently our algorithm or method suitable of computer application will run. Therefore, it is likely that the values for the probability matrix (Eq. 2) associated to a fixed or particular keyboard will be obtained via testing or experiment. It is also possible that the values in the probability matrix (Eq. 2) are user customizable or user specific. It is contemplated that the device of the present invention will initiate a learning phase where the values of the probability matrix are seeded. There may also be stock customizable options (for example, a left-handed user might miss keys differently than a right-handed user).

Comparing to Dictionary Words

The probability matrix (Eq. 2) allows us to associate to every word in our dictionary a probability that the user intended on entering that word given his entered string. This works in the following manner. Suppose the user enters the string "α 1 α 2 α 3". We consider the dictionary word "β1β2β3". We know that if the user intended on typing "β1", he would strike "α 1" with probability P (β1; α 1). Similarly, if the user intended on typing "β2", he would strike "α 2" with probability P (β2; α 2). Therefore, we can say that if a user intended on typing "β1β2β3", he would type "α 1 α 2 α 3" with probability P (β; α 1) P (β; α 2) P (β; α 3). In this manner, we associate a number to every dictionary word, based upon the string entered by the user. If the user has entered n letters in the string, only the first n letters of the dictionary words would be used.

Note that this number gives the probability that the user would type the string "α 1 α 2 α 3" if he intended on typing the word "β1β2β3". We would like to know the probability that the user intended on typing "β1β2β3" given that he typed "α 1 α 2 α 3". A learned reader will recognize this as a statement of conditional probability. We require an additional piece of information, namely a probability associated to each dictionary word indicating the likelihood that word will be intended. In the text entry example 1, this could be given by word frequency or more sophisticated grammatical tools based on sentence context. In the numerical code entry of example 2, this could be the proportion of each particular item in inventory. The absence of such a likelihood associated to each word can be interpreted as assigning equal likelihood to the occurrence of each dictionary word.

We continue our numerical keypad example 2 as shown in FIG. 2. Here our dictionary is a collection of 4-digit codes which correspond to such things as products in inventory. Suppose the set of these codes is

I={1128; 2454; 3856; 9988; 2452; 1324; 6752; 4841}.

The user then enters the string "684". We then use these three numbers and the values inherent in our probability matrix to associate to each word a probability:

TABLE THREE

| Word | Probability |
| --- | --- |
| 1128 | p16p18p24 = 0 |
| 2454 | p26p48p54 = 0.00025 |
| 3856 | p36p88p54 = 0.012 |
| 9988 | p96p98p84 = 0.002 |
| 2451 | p26p48p54 = 0.0025 |
| 1324 | p16p38p24 = 0 |
| 6752 | p66p78p54 = 0.012 |
| 4841 | p46p88p44 = 0 |

Assuming that all items exist in equal proportion in inventory, one can then say that the user was most likely trying to enter the codes "6752" or "3856" as both have the highest probability among the set. If it was know that there was a higher proportion of item number "6752" in inventory, then "6752" would then become a better guess than "3856".

Referring to FIG. 3, a flowchart 300 depicting an example for using the present invention is shown. A part of a key board is formed or provided to a user for entering information (Step 302). A probability distribution of a specific group of users regarding the part of key board is determined (Step 304). The probability distribution may be in the form of a probability matrix such as the one shown supra. A dictionary of comprising predetermined words is provided (Step 306). Associate every word in the dictionary a probability and frequency (a likelihood of occurrence) that the user intended on entering that word based upon his entered string (Step 308). In this manner, we associate a number to every dictionary word, based upon the string entered by the user. If the user has entered n letters in the string, only the first n letters of the dictionary words would be used. Associate the n letters entered to a set of words in the dictionary each having a corresponding probability (Step 310). This probability or the first probability is then multiplied by a second probability that this word is intended (as described in the above paragraph) (Step 311). Note that the absence of this step is tantamount to setting each word to be equally likely which in not desired by the present invention. Choose the words in the set having the highest probability as the likely word entered by the user (Step 312).

As can been seen, the present invention describes a method and apparatus for finding the likelihood of words in dictionaries matching with the user input. There may be one or many matches with varying degree of probabilities based on the user input and the quality of the dictionary.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A computer-implemented method for text input, the method comprising:
   receiving input indicative of a user striking a pressed key represented on an input device;
   receiving a probability distribution based at least in part on the location on the input device of the pressed key relative to locations of two or more adjacent keys represented on the input device,
      wherein, for the pressed key and one of the adjacent keys, the probability distribution indicates a probability that the adjacent key was intended when the pressed key was struck, and
      wherein the probability distribution indicates a higher probability for adjacent keys in the same row as the pressed key than for adjacent keys in one or more other rows; and
   in response to receiving the input indicative of a user striking the pressed key, using a processor and the probability distribution to select at least one candidate word.

2. The method of claim 1 further comprising using a dictionary to select the at least one candidate word.

3. The method of claim 1, further comprising:
   using a dictionary to select the at least one candidate word;
   wherein the input is one of multiple inputs where each of the multiple inputs are translated into a string, and
   wherein the method further comprises determining a probability of one or more strings corresponding to the string based at least in part on a probability distribution corresponding to the multiple inputs.

4. The method of claim 1,
   wherein probabilities of the probability distribution below a particular threshold are set to 0, and
   wherein the one or more other rows consist of one or more rows perceptually lower on the input device than the same row as the pressed key.

5. A computer-readable memory device storing instructions configured to, when executed by a computing device, cause the computing device to perform operations for text input, the operations comprising:
   receiving input indicative of a user striking a pressed key represented on an input device;
   receiving a probability distribution based at least in part on the location on the input device of the pressed key relative to locations of two or more adjacent keys represented on the input device,
      wherein, for the pressed key and one of the adjacent keys, the probability distribution indicates a probability that the adjacent key was intended when the pressed key was struck, and
      wherein the probability distribution indicates a higher probability for adjacent keys in the same row as the pressed key than for adjacent keys in one or more other rows; and
   in response to receiving the input indicative of a user striking the pressed key, using a processor and the probability distribution to select at least one candidate word.

6. The computer-readable memory device of claim 5, wherein the operations further comprise using a dictionary of words to select the at least one candidate word.

7. The computer-readable memory device of claim 5,
   wherein the operations further comprise using a dictionary of words to select the at least one candidate word,
   wherein the operations further comprise associating multiple words in the dictionary with a corresponding probability, and
   wherein each corresponding probability is a probability that the word is intended based at least in part on one or more of a word frequency, a grammatical rule, and a proportion of an item in an inventory.

8. The computer-readable memory device of claim 5,
   wherein the operations further comprise using a dictionary of words to select the at least one candidate word; and
   wherein the operations further comprise associating a set of n (n being a natural number) letters entered to a set of words in the dictionary.

9. The computer-readable memory device of claim 5,
   wherein the operations further comprise using a dictionary of words to select the at least one candidate word; and
   wherein the operations further comprise associating a set of n (n being a natural number) letters entered to a set of words in the dictionary; and
   wherein using the probability distribution to select at least one candidate word comprises selecting words in the set of words having the highest probability.

10. The computer-readable memory device of claim 5, wherein the operations further comprise providing a learning phase where values of a probability matrix are seeded.

11. The computer-readable memory device of claim 5,
   wherein the operations further comprise selecting one of several pre-determined probability matrices based at least in part on handedness of the user, and
   wherein at least one of the one probability matrices is associated with a left-handed user and at least one other of the probability matrices is associated with a right-handed user.

12. The computer-readable memory device of claim 5, wherein the probability distribution is an N by N matrix where N is a number of keys represented by the input device and wherein a matrix entry at position (I, J) is a probability that the $J^{th}$ key was intended when the $I^{th}$ key was pressed.

13. The computer-readable memory device of claim 5,
   wherein probabilities of the probability distribution below a particular threshold are set to 0, and
   wherein the one or more other rows consist of one or more rows perceptually lower on the input device than the same row as the pressed key.

14. A text input system comprising:
   a memory;
   an input interface configured to receive input indicative of a user striking a pressed key;
   a probability application module configured to receive a probability distribution, wherein the probability distribution is based at least in part on the location of the pressed key on the input device relative to two or more adjacent keys,
      wherein, for each pair comprising the pressed key and one of the adjacent keys, the probability distribution indicates a probability that the adjacent key was intended when the pressed key was struck, and
      wherein the probability distribution indicates a higher probability for adjacent keys in the same row as the pressed key than for adjacent keys in one or more other rows; and a processor configured to, in response to receiving the input indicative of a user striking the pressed key, using the probability distribution to select at least one candidate word.

15. The system of claim 14, wherein the keyboard is a touchscreen keyboard, and wherein the probability distribution comprises an N by N matrix where N is a number of keys represented by the input device and wherein a matrix entry at position (I, J) is a probability that the $J^{th}$ key was intended when the $I^{th}$ key was pressed.

16. The system of claim 14, wherein probabilities of the probability distribution below a particular threshold are set to 0, and wherein the one or more other rows consist of one or more rows perceptually lower on the input device than the same row as the pressed key.

17. The system of claim 14, further comprising a probability distribution creation component configured to provide a learning phase where values of one or more probability distributions are seeded.

18. The system of claim 14, wherein the probability distribution is a probability matrix selected, based at least in part on handedness of the user, from one of several pre-determined probability matrices, and wherein at least one of the one probability matrices is associated with a left-handed user and at least one other of the probability matrices is associated with a right-handed user.

19. The system of claim 14, wherein the processor is further configured to select the at least one candidate word by associating each of at least two words in a dictionary with a corresponding probability by multiplying multiple probabilities of one or more probability distributions comprising the probability distribution, and wherein each of the multiple probabilities is associated with a particular key in a received sequence of selected keys comprising the pressed key.

20. The system of claim 14, wherein the processor is further configured to select the at least one candidate word by associating each of at least two words in a dictionary with a corresponding probability by multiplying multiple probabilities of one or more probability distributions comprising the probability distribution, and wherein each of the multiple probabilities is associated with a particular key in a received sequence of selected keys comprising the pressed key, and wherein associating each of the at least two words in the dictionary with the corresponding probability further comprises adjusting at least one of the corresponding probabilities to reflect a frequency of use of the word.

* * * * *